Sept. 28, 1965  C. F. MILLER ETAL  3,208,892
SEALED ARTICLES AND METHODS OF FORMING THE SAME
Filed Sept. 15, 1960  2 Sheets-Sheet 1

INVENTORS
Carl F. Miller &
Donald I. Gray
BY
Charles F. Renz
ATTORNEY

Sept. 28, 1965   C. F. MILLER ETAL   3,208,892
SEALED ARTICLES AND METHODS OF FORMING THE SAME
Filed Sept. 15, 1960   2 Sheets-Sheet 2

United States Patent Office 3,208,892
Patented Sept. 28, 1965

3,208,892
SEALED ARTICLES AND METHODS OF
FORMING THE SAME
Carl F. Miller, Bath, N.Y., and Donald I. Gray, Geneva, Ill., assignors to Westinghouse Electric Corporation, East Pittsburgh, Pa., a corporation of Pennsylvania
Filed Sept. 15, 1960, Ser. No. 56,304
4 Claims. (Cl. 156—89)

This invention relates to joining members in a manner to form tight seals between them and, particularly, to the joining of glass or ceramic members. This invention also relates to the preparation of members prior to joining and, also, to the articles formed in accordance with the methods taught herein. One particular application in which the practice of the present invention is advantageous is in the sealing of envelopes for electronic tubes or the like.

Prior sealing methods for making glass-to-glass or glass-to-metal seals have often involved the use of a powdered glass of the same composition as the glass to be joined. This powdered glass is formed in a suspension and deposited on the surface of the parent glass member prior to joining. Since the powdered glass and the parent glass member are of the same composition, when the powdered glass is at a sufficiently high temperature to flow, the parent glass member is also at the flow point and may be deformed to an extent which is highly undesirable.

In recent years, there have become available glass compositions which have sufficiently good thermal expansion characteristics to be used in glass-to-glass or glass-to-metal seals and which further have a flow point at a substantially lower temperature than that of most parent glass members which it is desired to join. Because of its low flow point, such a material is known as a soft sealing glass or a solder glass. For example, a solder glass material which flows readily at about 500° C. may be used with a parent glass member having a flow point of around 1000° C., the flow point being the temperature at which the member becomes substantially molten. Therefore, there is little danger of the parent glass member being deformed during the sealing operation. There are, however, certain other physical effects which generally result in such a seal being opaque in appearance and having gas bubbles therein.

It is, therefore, an object of the present invention to form seals which are transparent in the seal area.

It is another object to provide seals which are uniformly strong and tight.

Another object is to provide seals in which the sealing area is of uniform composition with substantially no gas bubbles trapped therein.

Another object is to provide improved methods for forming glass-to-glass or glass-to-metal seals.

According to the present invention, there is provided a method for joining a first member to a second member which includes, prior to the actual joining operation, a process by which at least one of the members has formed thereon a transparent, strong and homogeneous layer of a sealing material having a flow point lower than that of the member to be joined. The method, generally, comprises the steps of coating the member with a suspension of the sealing material and heating the coated member at a temperature below the flow point of the sealing material to remove the liquid constituents thereof, including usually a binder and a solvent, in an oxidizing atmosphere and then heating the coated member at a low pressure or in a vacuum at a temperature between the flow point of the sealing material and that of the member to fuse the sealing member into continuous and homogeneous layer. According to another feature of the invention, articles are provided which comprise a first member sealed to a second member having therebetween a layer of sealing material formed in the just-mentioned manner.

The features of the present invention which are believed to be novel are set forth with particularity in the appended claims. The present invention, both as to its organization and manner of operation, together with the above-mentioned and further objects and advantages thereof, may best be understood by reference to the following description, taken in connection with the accompanying drawings, in which:

Figure 1A:
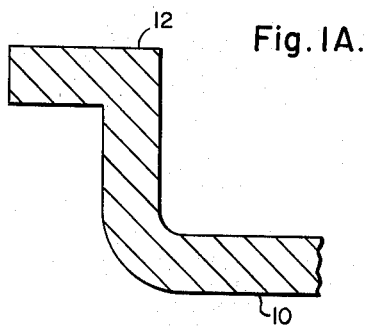
FIGURES 1A–1E are partial sectional views showing the appearance of a member after different processing steps are performed.
Figure 1B:
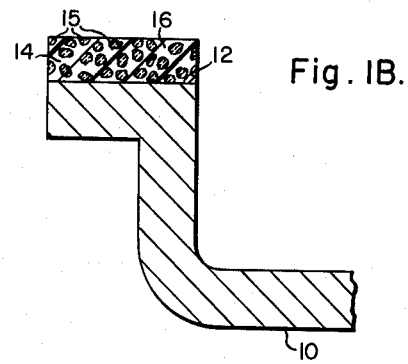
Figure 1C:
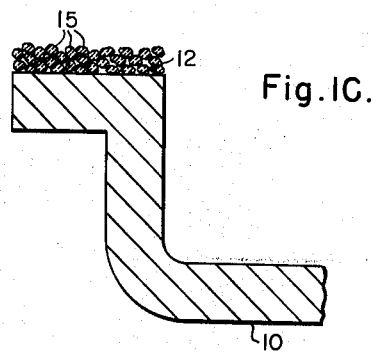
Figure 1D:
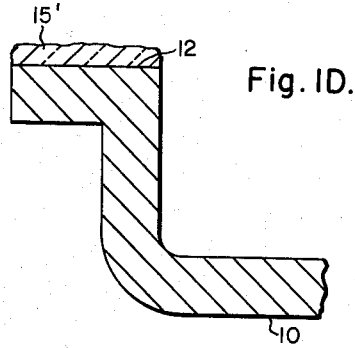
Figure 1E:
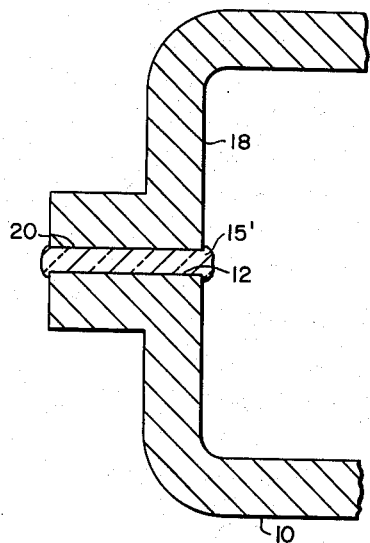

FIGURES 1A through 1E show the resulting affect of the processing steps upon a part 10 which is to be sealed. The part 10 is first cleaned, FIG. 1A, so as to provide a sealing surface 12 free of foreign matter so that the sealing material can readily adhere thereto. Step B, FIG. 1B, is the depositing of a suspension of a sealing material in a suitable vehicle, of a binder and a solvent, on the surface which is to be joined. The solvent generally evaporates leaving an adherent layer 14 of solder glass particles 15 in the viscous binder 16. For glass-to-glass or glass-metal seals, the sealing material may be a solder glass known under the tradename Corning No. 7570. Suitable solder glass compositions are also disclosed in U.S. Patent 2,642,633. In step C, FIG. 1C, the coated part is heated at a controlled temperature in an oxidizing atmosphere to remove the liquid vehicle or solvent and binder with which the solder glass particles were suspended. The solder glass particles 15 remain on the surface 12. In step D, FIG. 1D, the part 10 is again heated at a controlled temperature, but this time in a vacuum, at a temperature sufficient to cause the solder glass particles to flow and form a continuous layer 15' which may be called a "preglazed" layer, over the surface 12 of the part 10. In step E, FIG. 1E, the part with the solder glass layer formed thereon is joined to another part 18, having a sealing surface 20 which may, but need not, have a similar solder glass layer to form a tight seal which is transparent to visible light, has a homogeneous composition and is uniformly strong throughout.

The most important steps in the above outlined process are that in which the binder constituents 16 are removed from the solder glass suspension and that in which the solder glass particles 15 are caused to flow and form a continuous layer 15'. In the first heating step, it is necessary that the temperature be maintained sufficiently high to oxidize or otherwise decompose the binder constituents but sufficiently low to prevent flowing of the solder glass material. That is, the temperature should be below the flow point of the solder glass material. If the temperature during this step reaches or exceeds the flow point of solder glass, the material will flow and gas from the atmosphere in which the operation is being performed will be trapped in the molten glass with resulting imperfections and disadvantages in the seal formed. A temperature satisfactory for this purpose is one which is approximately 50° C. higher than the solder glass annealing point, the annealing point being determined by well known standard techniques as that point in which the strain in the material is substantially removed.

The second heating step must be performed at a temperature which exceeds the flow point of the solder glass material but which is not as high as the flow point of the part which is to be sealed. This condition is necessary so that the solder glass will flow evenly over the surface of the parent member which retains its rigid nature. A suitable temperature for this operation is one which is about 135° C. higher than the annealing point of the solder glass. This operation is performed in a vacuum so that any gas which is adsorbed on the surface of the parent member or on the solder glass particles may be driven off as the solder glass flows. As a result of this operation, the solder glass melts into the homogeneous mass without any air inclusions or bubbles. After cooling in vacuum, the member may now be exposed to air and joined to another member by any well known technique, for example by heating and pressing. The resulting seal will retain the quality of the solder glass coating which has been prepared in accordance with this invention.

Figure 2:
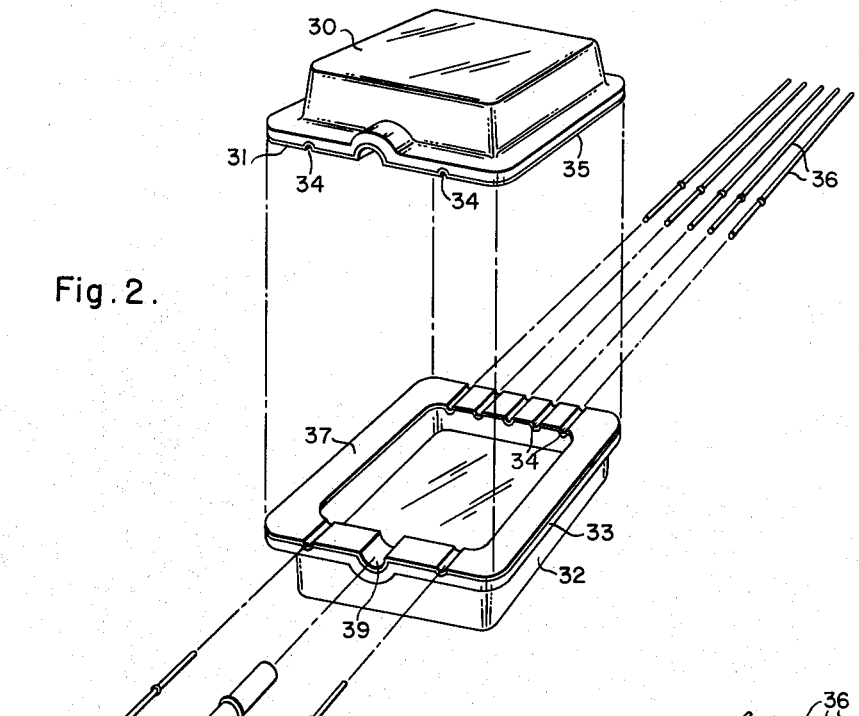
FIGURE 2 is an exploded perspective view of an electron discharge device envelope and leads extending therethrough which may be assembled in accordance with the methods described herein.

Referring now to FIG. 2, there are shown the parts of one electron tube with which the practice of the present invention is advantageous. Shown in the figure are only the external components of this device and not the internal working parts. The envelope consists of a top member 30 and a bottom member 32 each of substantially the same shape which is that of a shallow box-like member with flange surfaces 31 and 33 around the periphery for sealing the two portions together. Each of the surfaces 31 and 33 has therein a plurality of grooves 34 at each end for the insertion of lead wires 36 which would be attached to the internal components and which would extend through the envelope for connection into a circuit. Also an exhaust tubulation 38 is provided to be sealed into a groove 39 in the envelope so that after joining of the envelope, the entire structure may be exhausted to the pressure necessary for operation of the device. Surfaces 31 and 33 are shown having layers 35 and 37 respectively of preglazed solder glass material in accordance with this invention. Only one such layer is essential. Also, the leads 36 and exhaust tubulation 38 may be subjected to preglazing if desired. The sort of envelope and other parts shown is one which has many advantages of compactness and easy fabrication into a circuit or other apparatus. Electronic devices which use an envelope substantially as shown are described more fully in U.S. Patents 2,862,136, 2,907,911, 2,929,668 and 2,933,634.

Figure 3:
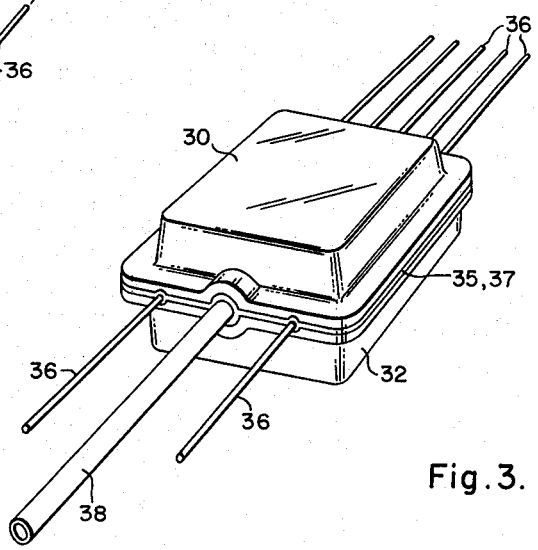
FIGURE 3 is a perspective view of the device shown in FIG. 3 after sealing has been performed.

Referring now to FIG. 3, there is shown the same device as that shown in FIG. 2 but it is now fully assembled in accordance with the teachings of this invention. The layers 35 and 37 on the respective surfaces 31 and 33 have now fused into a single layer. Besides sealing the envelope portions 30 and 32, this layer 35–37 surrounds and seals each lead 36 and the exhaust tubulation 38 to each envelope member.

Following is a specific process by which the envelope shown in FIG. 3 may be formed. This method involves preglazing a solder glass coating on the envelope halves 30 and 32 and sealing them together with the necessary leads 36 and exhaust tubulation 38 therebetween. It will be obvious that the exhaust tubulation and lead wires may also be preglazed if necessary and that further processing steps may be exercised in order to remove oxidation from the lead wires 36 prior to finally exhausting and sealing the tube.

The envelope portions 30 and 32 are placed in a clean container and hot deionized water sufficient to cover the parts with a few drops of a polyglycol ether derivative sold under the tradename TMN detergent is placed in the container with them. The parts are then ultrasonically cleaned for about two minutes. Rinse the parts twice in deionized water. Prepare a 5% hydrofluoric acid solution in a plastic container deep enough to cover one part. Clean the parts one at a time by dipping in and out of the solution about three times in 10 to 15 seconds. Deposit the parts in a container of deionized water. Rinse the parts in 6 changes of deionized water. Rinse the parts in clean methanol. Dry in an air oven.

The solder glass suspension is prepared of about 70 to 76 grams of 325 mesh, 7570 solder glass in 10 cc. of 3% butyl cellusolve and Lucite 44 solution. The solution is rolled for about 12 to 24 hours prior to using. The surfaces 31 and 33 of the envelope portions 30 and 32 are painted with the prepared suspension. The coated envelope portions are dried in the air for about 2 hours. The envelope portions are then baked in a furnace at about 420° C. for about 20 minutes while flushing with a small flow of oxygen. The oxygen flow is then turned off and a vacuum pump started to evacuate to a pressure of about one inch of mercury. The temperature in the oven is raised to about 500° C. and held for about 10 minutes. The oven is then shut off and cooled slowly below 400° C. and then the vacuum pump may be shut off.

The practice of the present invention is particularly advantageous in sealing envelope members which are of a clean glass material such as those known as code 012 or code 008. In this manner a transparent envelope with a transparent seal may be formed which considerably enhances the appearance of the envelope and also, gives increased strength to the seal.

While the present invention has been shown and described in certain forms only, it will be obvious to those skilled in the art that it is not so limited but is susceptible to various changes and modifications without departing from the spirit and scope thereof.

We claim as our invention:

1. The method of joining a first member to a second member comprising the steps of depositing a coating on a surface of said first member of a suspension of a solder glass sealing material in an organic liquid vehicle, said sealing material having a flow point lower than that of said first member, heating said coated member in an oxidizing atmosphere to a temperature not as high as the flow point of said sealing material to remove the liquid constituents of said suspension and then heating said coated member in a vacuum to a temperature at least as high as the flow point of said sealing material and not as high as the flow point of said first member to form a fused layer of said sealing material on said member, placing said surface of said first member having said fused layer thereon in contact with said second member and joining said members by fusion of said sealing material.

2. The method of joining a first member of a material selected from the group consisting of glass, ceramic and metal for joining to a second member comprising the steps of depositing a coating on a surface of said first member of a suspension of a powdered solder glass material in a solution comprising an organic binder and an organic solvent, said solder glass material having a flow point lower than that of said first member, heating said coated member in an oxidizing atmosphere to a temperature not as high as the flow point of said material to remove the binder and solvent of said suspension and then heating said coated member in a vacuum to a temperature at least as high as the flow point of said solder glass material and not as high as the flow point of said first member to form a fused layer of said solder glass material on said member, placing said surface of said first member having said fused layer thereon in contact with said second member and joining said members by fusion of said solder glass material.

3. The method of joining a first light-transmissive envelope member to a second light-transmissive glass envelope member comprising the steps of depositing a coating on a surface of said first member of a suspension of a powdered solder glass material in an organic solution of a binder and a solvent, said solder glass material being thermoplastic and having a flow point lower than that of said first member, heating said coated member in an oxidizing atmosphere to a temperature not as high as the flow point of said solder glass material to remove said binder and said solvent and then heating said coated member in a vacuum to a temperature at least as high as the flow point of said solder glass material and not as high as the flow point of said first member to form a fused layer of said solder glass material on said surface of said first member, placing said surface of said first member having said fused layer thereon in contact with said second member and joining said members by fusion of said solder glass material.

4. The method of joining a first member of a material selected from the group consisting of glass, ceramic and metal to a second member comprising the steps of depositing a coating on a surface of said first member of a suspension of a powdered solder glass material in an organic liquid vehicle, said solder glass material having a flow point lower than that of said first member, heating said coated member in an oxidizing atmosphere to a temperature approximately 50° C. higher than the annealing point of said solder glass material to remove the liquid constituents of said suspension, and then heating said coated member in a vacuum to a temperature approximately 135° C. higher than the annealing point of said solder glass material and not as high as the flow point of said first member to form a fused layer of said solder glass material on said member, placing said surface of said first member having said fused layer thereon in contact with said second member and joining said members by fusion of said solder glass material.

References Cited by the Examiner

UNITED STATES PATENTS

| | | | |
|---|---|---|---|
| 2,388,611 | 11/45 | Hess | 117—125 |
| 2,634,219 | 4/53 | Smith | 117—125 |
| 2,775,641 | 12/56 | Swartz | 174—50.61 |
| 2,808,448 | 10/57 | Bleuze et al. | 174—50.61 |
| 2,889,952 | 6/59 | Claypoole | 49—82 XR |
| 2,959,493 | 11/60 | Vincent | 106—53 XR |

FOREIGN PATENTS 626,008  7/49  Great Britain.

RICHARD D. NEVIUS, *Primary Examiner.*

EARL M. BERGERT, IVAN R. LADY, *Examiners.*